United States Patent
Birkner et al.

(10) Patent No.: US 7,451,740 B2
(45) Date of Patent: Nov. 18, 2008

(54) ADAPTATION METHOD FOR OPTIMIZED COMBUSTION OF A FUEL QUANTITY INJECTED INTO A CYLINDER OF AN INTERNAL COMBUSTION ENGINE

(75) Inventors: Christian Birkner, Irlbach (DE); Joris Fokkelman, Tegernheim (DE); Karl Müller, Hannover (DE)

(73) Assignee: Siemens VDO Automotive AG, Munich (DE)

( * ) Notice: Subject to any disclaimer, the term of this patent is extended or adjusted under 35 U.S.C. 154(b) by 0 days.

(21) Appl. No.: 11/775,046

(22) Filed: Jul. 9, 2007

(65) Prior Publication Data
US 2008/0011273 A1     Jan. 17, 2008

(30) Foreign Application Priority Data
Jul. 12, 2006   (DE) .................... 10 2006 032 278

(51) Int. Cl.
*F02D 41/00*  (2006.01)
(52) U.S. Cl. ........................................ 123/436
(58) Field of Classification Search ............... 123/435, 123/436
See application file for complete search history.

(56) References Cited

U.S. PATENT DOCUMENTS

| 6,672,284 B2 | 1/2004 | Majima .................... 123/436 |
| 7,139,657 B2 | 11/2006 | Bouchain et al. ........... 701/104 |

FOREIGN PATENT DOCUMENTS

| DE | 4418578 A1 | * 11/1995 |
| DE | 102005052024 | 5/2006 |
| EP | 0940571 | 9/1998 |
| JP | 2002130014 | 9/2002 |
| WO | 2004053316 | 6/2004 |

OTHER PUBLICATIONS

European Search Report; 2006P07598EP; pp. 4.

* cited by examiner

*Primary Examiner*—Hai H Huynh
(74) *Attorney, Agent, or Firm*—Baker Botts L.L.P.

(57) ABSTRACT

In an adaptation method of an internal combustion engine for optimized combustion, the actually supplied cylinder-specific air masses are determined by determining the change in speed of the internal combustion engine within a thrust phase and by assigning these changes in speed to the cylinder-specific compression phases 20. This enables the fuel quantity to be injected to be more precisely adjusted to the cylinder-specific air mass available.

18 Claims, 2 Drawing Sheets

ADAPTATION METHOD FOR OPTIMIZED COMBUSTION OF A FUEL QUANTITY INJECTED INTO A CYLINDER OF AN INTERNAL COMBUSTION ENGINE

RELATED APPLICATION

This application claims priority from German Patent Application No. 10 2006 032 278.9, which was filed on Jul. 12, 2006, and is incorporated herein by reference in its entirety.

TECHNICAL FIELD

The present invention relates to an adaptation method of an internal combustion engine for optimized combustion of a fuel quantity injected into a cylinder of the internal combustion engine.

BACKGROUND

An air mass sensor is usually used in an internal combustion sensor to determine the air mass supplied to the internal combustion engine and consumed during combustion. To be able to determine and influence the pollutant emissions of the internal combustion engine, knowledge of the air/fuel mixture which is supplied to the individual cylinders is required. Furthermore, the pressure prevailing in the cylinders is a significant auxiliary factor contributing to the ability to predict the type and quantity of emissions from the internal combustion engine. The air mass flow of an internal combustion engine is currently only known as an average value across all cylinders of the internal combustion engine, if an individual air mass sensor is not used per cylinder. The use of an individual air mass sensor per cylinder is however cost-intensive and is thus not suited to the mass production of motor vehicles within the mid-range price segment.

It is however generally known that tolerances in the cylinder geometry and differences in the compression rates of the individual cylinders leads to inaccurate information relating to the actual air mass supplied to the individual cylinders. It is also not possible to deduce accurately from this information which pressure ratios actually prevail in each individual cylinder. This incomplete information automatically results in inaccurate knowledge relating to the combustion and the air/fuel mixture taking place.

As a result of the above situation, the disadvantage emerges that the specific conditions in the individual cylinders of an internal combustion engine are not known in order to reduce the pollutant emissions of the internal combustion engine.

SUMMARY

The conditions in the internal combustion engine can be better detected according to an embodiment of an adaptation method of an internal combustion engine for optimized combustion of a fuel quantity injected into a cylinder, which may comprise the steps of:

a) Recognizing a thrust phase of the internal combustion engine, b) Determining a temporal change in speed/rpm of the internal combustion engine within the thrust phase and assigning the temporal change in speed/rpm to a cylinder-specific compression phase of the internal combustion engine, c) Determining a cylinder-specific air/gas charge based on the temporal change in speed/rpm in the cylinder-specific compression phase and d) Adjusting a cylinder-specific fuel-air mixture based on the determined cylinder-specific air/gas charge. Such a method allows to further reduce the pollutant emissions of the internal combustion engine.

BRIEF DESCRIPTION OF THE DRAWINGS

Embodiments of the present invention are described in more detail with reference to the appended drawings, in which.

DETAILED DESCRIPTION

Figure 1:
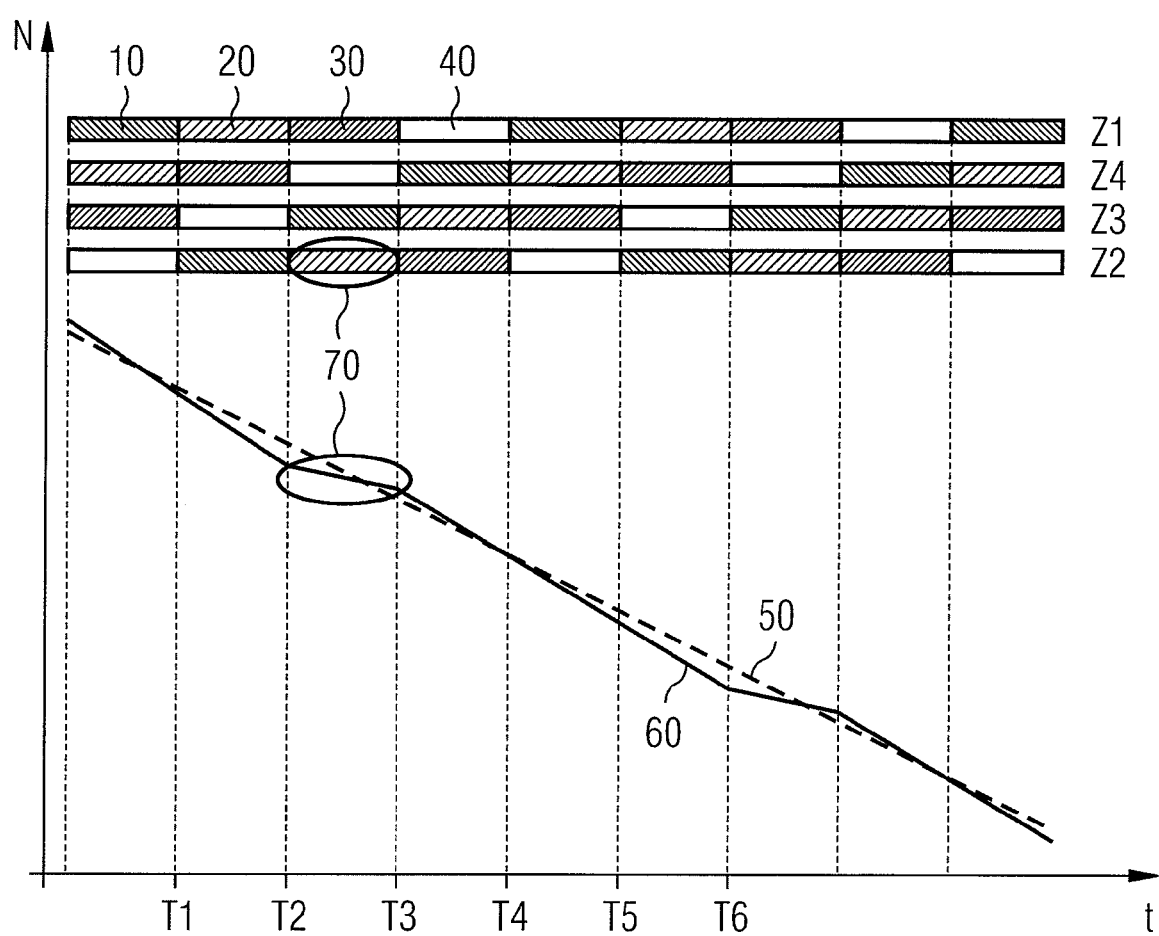
FIG. 1 shows a schematic illustration of a change in speed/rpm as a function of the individual phases of a working cycle of an internal combustion engine and FIG. 2 shows a flow diagram of an embodiment of the present adaptation method.

The adaptation method according different embodiments of an internal combustion engine for optimized combustion of a fuel quantity injected into a cylinder may include the following steps: Recognizing a thrust phase of the internal combustion engine, determining a temporary change in revolutions per minute (rpm)/speed in the combustion engine within the thrust phase and assigning the temporary change in speed/rpm to a cylinder-specific compression phase of the internal combustion engine, determining a cylinder-specific air/gas charge based on the temporary change in speed/rpm in the cylinder-specific compression phase and adjusting a cylinder-specific fuel/air mixture based on the determined cylinder-specific air/gas charge.

The present adaptation method is based on the approach of considering the air supply to the cylinders of the internal combustion engine in a cylinder-specific manner, instead of implementing a global evaluation of the air supply across all cylinders of the internal combustion engine. This cylinder-specific evaluation provides concrete results, which allow an air quantity to actually reach the individual cylinders and be available there for combustion. The characterization of the cylinder-specific air quantity is carried out indirectly by way of a sensor installed as standard in the motor vehicle. This is the speed/rpm sensor, with the aid of which the different work cycles of the internal combustion engine can be analyzed. If the change in speed/rpm of the internal combustion is namely considered with regard to a cylinder-specific compression phase, a measure for the air mass processed in this cylinder is obtained. To simplify the evaluation according to the above method, the internal combustion engine is examined in a thrust phase. Within this thrust phase, no fuel quantities are injected into the individual cylinders, so that in this way no influence on data to be evaluated can be expected. After having obtained more detailed information relating to the cylinder-specific air/gas charge from the evaluation of the cylinder-specific change in speed/rpm, the fuel quantity injected into the individual cylinders is adjusted accordingly in order to achieve the actually desired air/fuel mixture in the individual cylinders of the internal combustion engine.

According to a further embodiment of the present adaptation method, the following steps are carried out: Detecting the speed/rpm of the internal combustion engine as a function of time and detecting the cylinder-specific compression phases of the internal combustion engine as a function of time.

According to an embodiment, to be able to interpret the determined course of the speed/rpm signal in the above adaptation method, the further steps may be included: calibrating the compression process of a cylinder as a function of its air/gas charge, calibrating the change in speed/rpm as a function of the compression process and/or setting up a functional relationship between the change in speed/rpm and the cylinder-specific air/gas charge in the compression phase of the internal combustion engine.

An embodiment of the present adaptation method is described in an example of a four cylinder internal combustion engine. A cycle of each cylinder Z1, Z2, Z3, Z4 of the internal combustion engine subdivides into an intake phase 10, a compression phase 20, a working phase 30 and an exhaust or discharge phase 40 (cf. FIG. 1). The temporal sequence of these phases 10, 20, 30, 40 of the internal combustion engine is generally known.

If the individual cylinders Z1, Z2, Z3 and Z4 of the internal combustion engine are numbered according to their firing order, the first cylinder Z1 passes through its compression phase 20 between time instants T1 and T2. The working phase of the first cylinder Z1 is started at time instant T2. At the same time, the second cylinder Z2 starts its intake phase 10 at time instant T1 and its compression phase at time instant T2. The cylinders Z3 and Z4 each start their compression phase 20 at time instants T3 and T4. The internal combustion engine thus passes through compression phases 20 of the individual cylinders Z1, Z2, Z3, Z4 which follow one another consecutively. After time instant T4, the internal combustion has passed through a complete working cycle, so that the already known working cycle of the internal combustion engine and its temporal sequence recur starting at time instant T5.

If the internal combustion engine comprises more than four cylinders for instance, the temporal sequence of compression phases 20 can similarly be determined. For a further distinction, in this case not only the individual cylinders, but also the division of the cylinders of the internal combustion engine into different cylinder banks can be used for instance. The cylinder-specific compression phases of an internal combustion engine can thus be assigned to specific time signals without any difficulty.

Each motor vehicle and/or each internal combustion engine also has standard equipment for detecting the speed/rpm N of the internal combustion engine as a function of time. The speed/rpm N is measured according to known methods, such as for instance using a crank-shaft sensor based on the Hall effect.

Within a thrust operation of the internal combustion engine, fuel is not injected into the individual cylinders. A thrust operation of this type concerns the coasting of the motor vehicle for instance, while the transmission system is not running idle. Thus combustion does not take place within the thrust operation of the internal combustion in the working phases 30 of the cylinders Z1, Z2, Z3 and Z4. In this working phase 30, only an expansion of the previously compressed air/gas charge of the respective cylinders Z1, Z2, Z3, Z4 is carried out. In the thrust phase, the compression phase 20 of the individual cylinders Z1, Z2, Z3, Z4 is thus that phase, in which the air/gas charge of the individual cylinders Z1, Z2, Z3, Z4 is supplied with energy, which results in the internal combustion engine braking. If the energy transfer into the other three phases 10, 30, 40 of the cylinders Z1, Z2, Z3, Z4, is disregarded or a constant drop in speed/rpm is assumed, in the thrust operation of the internal combustion engine, the speed/rpm N of the internal combustion engine in the thrust phase is only (additionally) reduced by means of the energy consumption in the compression phases 20 of the individual cylinders Z1, Z2, Z3, Z4.

The intensity of the speed/rpm reduction in the compression phase 20 is determined by the cylinder-specific compression work to be carried out or the cylinder-specific compression rate. Differences in the compression work or compression rate of the individual cylinders Z1, Z2, Z3, Z4 compared with one another result from different geometries of the cylinder-specific air path. These different geometries of the cylinder-specific air path influence the air mass supplied to the cylinders Z1, Z2, Z3, Z4. The above differences result for instance from manufacturing tolerances, flow influences in the air path and the signs of ageing in the internal combustion engine, to mention just a few examples.

If the compression work or compression rate to be performed is greater in one of the cylinders Z1, Z2, Z3, Z4 than in another cylinder of the internal combustion engine, this results in a more significant drop in speed/rpm in the time window of the cylinder-specific compression phase 20 in the thrust phase of the internal combustion engine. This is illustrated using reference numeral 70 in FIG. 1. If the internal combustion engine is in the thrust operation, the speed/rpm N reduces with time t. If this is measured jointly across all cylinders Z1, Z2, Z3, Z4, a constant drop in speed/rpm results which is shown in FIG. 1 by way of the dotted line 50. $dN/dt<0$ thus represents the dotted line 50.

As the temporal sequence of the different cylinder-specific phases 10, 20, 30 is known (see above), the change in speed/rpm in the cylinder-specific compression phases 20 of the internal combustion engine can be determined from the speed/rpm signal N measured similarly by way of the total time t. As the energy consumption of the intake phase 10, working phase 30 and exhaust phase 40 are assumed to be constant (see above), fluctuations result during the reduction in speed/rpm as a result of different cylinder-specific compression rates and/or differently sized cylinder-specific air quantities, which are compressed in the different cylinders Z1, Z2, Z3, Z4. This relationship is illustrated by the continuous line 60 and the encircled areas 70 in FIG. 1. The area 70 refers to the compression phase 20 of the cylinder Z2 and the cylinder-specific change in speed/rpm resulting therefrom in the time window between T2 and T3. The reduction in speed/rpm is thus greater for a cylinder with a higher compression process than for a cylinder with a lower compression process.

If the reduction in speed/rpm in the cylinder-specific compression phases 20 of the internal combustion engine is thus compared, differences in the cylinder-specific compression rates and/or in the cylinder-specific compression process of the individual cylinders Z1, Z2, Z3, Z4 of the internal combustion engine compared with one another thus emerge. If this information is used to determine and adjust the quantity of air/gas present in the cylinders Z1, Z2, Z3, Z4 and the active cylinder-specific pressure, the cylinder-specific air/fuel mixture is herewith optimized, thereby reducing the harmful emissions. Cylinder-specific air and fuel quantities to be supplied are adjusted in a more accurate manner on this basis, thereby having a positive effect on the combustion efficiency, combustion temperature, the composition of the emissions of the internal combustion engine and the control of the specific cylinder behavior.

Figure 2:
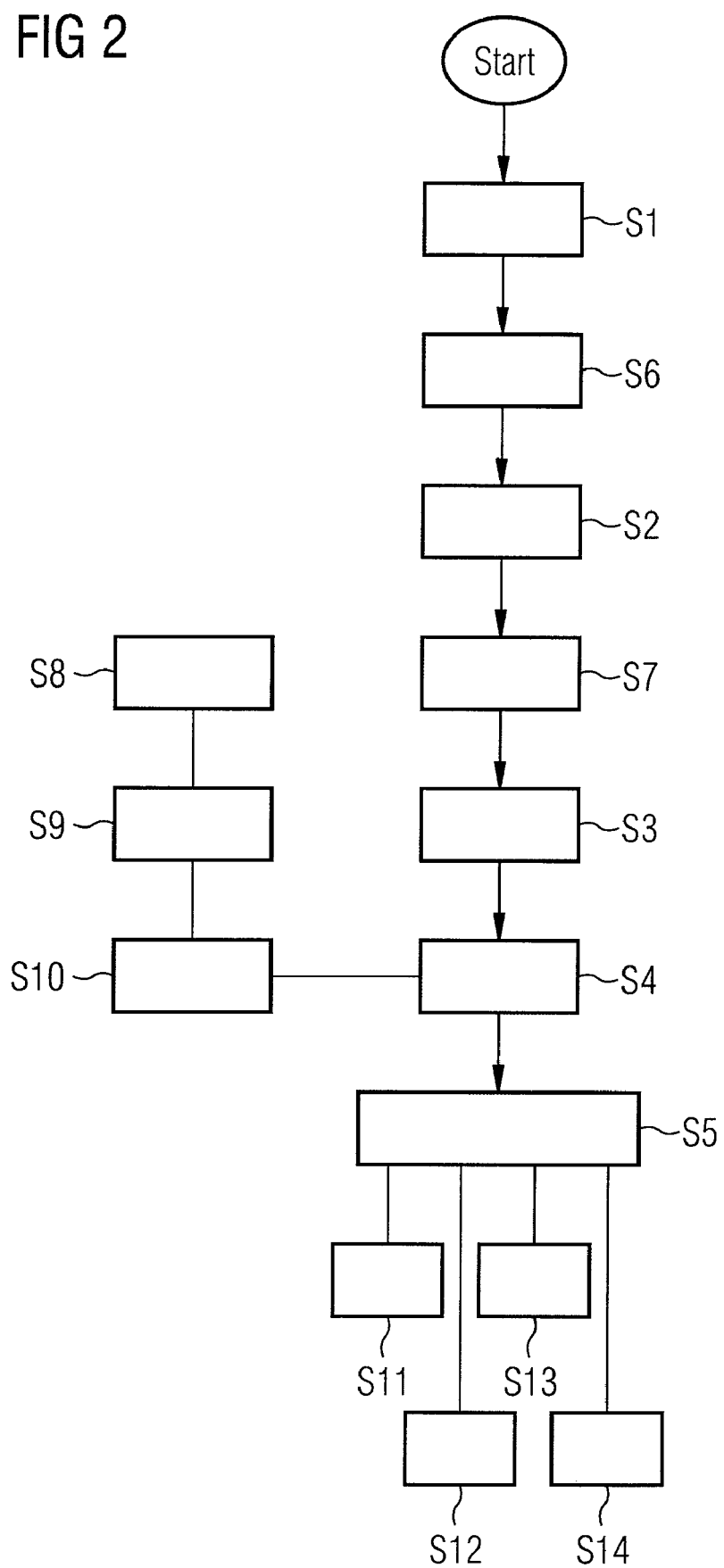

A flow diagram of another embodiment of the above adaptation method is shown in FIG. 2.

After the start of the adaptation method, recognition of a thrust phase of the internal combustion engine first takes place in a first step S1, within which the adaptation method is carried out. Within this thrust phase, the speed/rpm of the internal combustion engine is detected with sufficient accuracy for the adaptation method as a function of time (step S6). The detected speed/rpm N, as a function of time, forms the basis for calculating the change in speed/rpm $dN/dt$ as a function of time (step S2). This step is carried out for instance in an engine controller of the internal combustion engine.

To be able to evaluate the change in speed/rpm in the cylinder-specific compression phase 20, the temporal occurrence of cylinder-specific compression phases 20 of the internal combustion engine is detected and/or identified. It is likewise conceivable for the time instants of the cylinder-specific compression phases 20 of the internal combustion engine to be read out from an engine controller. (step S7). In step S3 the temporal speed/rpm changes are assigned to the cylinder-specific compression phases 20 based on the known change in speed/rpm as a function of time and the temporal occurrence of the cylinder-specific compression phases 20.

Based on the above assignment, the adaptation method determines the cylinder-specific air/gas charge based on the assigned temporal change in speed/rpm in the cylinder-specific compression phase 20 (step S4). The cylinder-specific air/gas charge can be determined for instance on the basis of a functional relationship between the change in speed/rpm in the cylinder-specific compression phase 20 and the cylinder-specific air/gas charge. This requires this functional relationship to be set up and stored for instance in the engine controller of the internal combustion engine (step S10).

According to an alternative of the present adaptation method, the function relationship is based on a calibration of the compression process as a function of the air/gas charge of the individual cylinders (step S8). It is also conceivable to calibrate the change in speed/rpm of the internal combustion engine as a function of the compression process of a cylinder (step S9). The functional relationship between the change in speed/rpm of the internal combustion engine and the cylinder-specific air/gas charge in the compression phase can thus be described with sufficient accuracy on the basis of the above calibration steps S8, S9.

After having determined the cylinder-specific air/gas charge (step S4), this information suggests the configuration of the cylinder-specific combustion of the internal combustion engine. For this purpose, a cylinder-specific fuel/air mixture based on the cylinder-specific air/gas charge is adjusted (step S5). This adjustment can be preferably carried out according to different alternatives. According to step S11, an adjustment of the fuel injection quantity is carried out. According to step S12, the valve timings for the air intake are adjusted. According to step S13, the pressure ratios in the air intake tract of the respective cylinder are adjusted. According to a further alternative, the geometry of the air intake is adjusted provided this can be changed (step S14).

The individual steps of the adaptation method according to FIG. 2 are listed again below in summarized form:
S1 Recognizing a thrust phase
S2 Determining the change in speed/rpm as a function of time
S3 Assigning the temporal change in speed/rpm to the cylinder-specific compression phases
S4 Determining a cylinder-specific air/gas charge based on the assigned temporal change in speed/rpm
S5 Adjusting a cylinder-specific fuel/air mixture based on the cylinder-specific air/gas charge
S6 Detecting the speed/rpm as a function of time
S7 Recognizing the temporal occurrence of the cylinder-specific compression phases of the internal combustion engine
S8 Calibrating the compression process as a function of the air/gas charge of a cylinder
S9 Calibrating the change in speed/rpm as a function of the compression process
S10 Setting up a functional relationship between the change in speed/rpm and the cylinder-specific air/gas charge in the compression phase
S11 Adjusting the fuel injection quantity
S12 Adjusting the valve timings for the air intake
S13 Adjusting the pressure ratios in the air intake tract
S14 Adjusting the geometry of the air intake

What is claimed is:

1. An adaptation method of an internal combustion engine for optimized combustion of a fuel quantity injected into a cylinder, comprising the following steps:
    a) Recognizing a thrust phase of the internal combustion engine,
    b) Determining a temporal change in speed of the internal combustion engine within the thrust phase and assigning the temporal change in speed to a cylinder-specific compression phase of the internal combustion engine,
    c) Determining a cylinder-specific air/gas charge based on the temporal change in speed in the cylinder-specific compression phase and
    d) Adjusting a cylinder-specific fuel-air mixture based on the determined cylinder-specific air/gas charge.

2. The adaptation method as claimed in claim 1, further comprising the following steps of:
    Detecting the speed of the internal combustion engine as a function of time and
    Detecting the cylinder-specific compression phases of the internal combustion engine as a function of time.

3. The adaptation method as claimed in claim 1, further comprising the following step of:
    Calibrating the compression process of a cylinder as a function of its air/gas charge.

4. The adaptation method as claimed in claim 3, further comprising the following step of:
    Calibrating the change in speed as a function of the compression process.

5. The adaptation method as claimed in claim 1, further comprising the following step of:
    Setting up a functional relationship between the change in speed and the cylinder-specific air/gas charge in the compression phase.

6. The adaptation method as claimed in claim 1, further comprising the following steps for adjusting the cylinder-specific fuel/air mixture:
    Adjusting the fuel injection quantity and/or
    Adjusting the valve opening times for the air intake and/or
    Adjusting the pressure ratios in the air intake tract and/or
    Adjusting the geometry of the air intake tract.

7. An adaptation method of an internal combustion engine for optimized combustion of a fuel quantity injected into a cylinder, comprising the following steps:
    a) Determining a thrust phase of the internal combustion engine,
    b) Determining a temporal change in revolutions per minute (rpm) of the internal combustion engine within the thrust phase and assigning the temporal rpm change to a cylinder-specific compression phase of the internal combustion engine,
    c) Determining a cylinder-specific air/gas charge based on the temporal rpm change in the cylinder-specific compression phase and
    d) Adjusting a cylinder-specific fuel-air mixture based on the determined cylinder-specific air/gas charge.

8. The adaptation method as claimed in claim 7, further comprising the following steps of:
    Detecting the rpm of the internal combustion engine as a function of time and
    Detecting the cylinder-specific compression phases of the internal combustion engine as a function of time.

9. The adaptation method as claimed in claim 7, further comprising the following step of:

Calibrating the compression process of a cylinder as a function of its air/gas charge.

10. The adaptation method as claimed in claim 9, further comprising the following step of:

Calibrating the change in rpm as a function of the compression process.

11. The adaptation method as claimed in claim 7, further comprising the following step of:

Setting up a functional relationship between the rpm change and the cylinder-specific air/gas charge in the compression phase.

12. The adaptation method as claimed in claim 7, further comprising the following steps for adjusting the cylinder-specific fuel/air mixture:

Adjusting the fuel injection quantity and/or

Adjusting the valve opening times for the air intake and/or

Adjusting the pressure ratios in the air intake tract and/or

Adjusting the geometry of the air intake tract.

13. A system for adapting of an internal combustion engine for optimized combustion of a fuel quantity injected into a cylinder, comprising:

a) Means for determining a thrust phase of the internal combustion engine, b) Means for determining a temporal change in revolutions per minute (rpm) of the internal combustion engine within the thrust phase and assigning the temporal rpm change to a cylinder-specific compression phase of the internal combustion engine, c) Means for determining a cylinder-specific air/gas charge based on the temporal rpm change in the cylinder-specific compression phase and d) Means for adjusting a cylinder-specific fuel-air mixture based on the determined cylinder-specific air/gas charge.

14. The system as claimed in claim 13, further comprising:

Means for detecting the rpm of the internal combustion engine as a function of time and Means for detecting the cylinder-specific compression phases of the internal combustion engine as a function of time.

15. The system as claimed in claim 13, further comprising:

Means for calibrating the compression process of a cylinder as a function of its air/gas charge.

16. The system as claimed in claim 15, further comprising:

Means for calibrating the change in rpm as a function of the compression process.

17. The system as claimed in claim 13, further comprising:

Means for setting up a functional relationship between the rpm change and the cylinder-specific air/gas charge in the compression phase.

18. The system as claimed in claim 13, further comprising:

Means for adjusting the fuel injection quantity and/or

Means for adjusting the valve opening times for the air intake and/or

Means for adjusting the pressure ratios in the air intake tract and/or

Means for adjusting the geometry of the air intake tract.

* * * * *